(12) United States Patent
Liao et al.

(10) Patent No.: US 11,714,554 B2
(45) Date of Patent: Aug. 1, 2023

(54) METHOD FOR AGGREGATION OPTIMIZATION OF TIME SERIES DATA

(71) Applicant: TAOS DATA, Beijing (CN)

(72) Inventors: Haojun Liao, Beijing (CN); Shengliang Guan, Beijing (CN); Hongze Cheng, Beijing (CN); Jianhui Tao, Beijing (CN)

(73) Assignee: TAOS DATA, Beijing (CN)

( * ) Notice: Subject to any disclaimer, the term of this patent is extended or adjusted under 35 U.S.C. 154(b) by 262 days.

(21) Appl. No.: 17/265,284

(22) PCT Filed: Jul. 18, 2019

(86) PCT No.: PCT/CN2019/096452
§ 371 (c)(1),
(2) Date: Jul. 9, 2021

(87) PCT Pub. No.: WO2020/024799
PCT Pub. Date: Feb. 6, 2020

(65) Prior Publication Data
US 2021/0333994 A1    Oct. 28, 2021

(30) Foreign Application Priority Data
Aug. 3, 2018 (CN) .......................... 201810879115.0

(51) Int. Cl.
*G06F 3/06* (2006.01)
(52) U.S. Cl.
CPC .............. *G06F 3/061* (2013.01); *G06F 3/064* (2013.01); *G06F 3/0655* (2013.01); *G06F 3/0673* (2013.01)
(58) Field of Classification Search
CPC ........ G06F 3/061; G06F 3/064; G06F 3/0655; G06F 3/0673
See application file for complete search history.

(56) References Cited

U.S. PATENT DOCUMENTS

2007/0282492 A1    12/2007  Valovage et al.
2013/0103657 A1*   4/2013  Ikawa ................. G06F 16/2477
                                                           707/693
(Continued)

FOREIGN PATENT DOCUMENTS

CN           104156385 A        11/2014
CN           105513095 A         4/2016
(Continued)

*Primary Examiner* — Edward J Dudek, Jr.
(74) *Attorney, Agent, or Firm* — Greer, Burns & Crain, Ltd.

(57) ABSTRACT

The invention discloses an aggregation optimized processing method for time-series data, characterized by comprising the following steps:
  writing a time-series data record into a database, forming a time-series database file, wherein the time-series database file comprises a data file and an index file, the data file comprises multiple data blocks, the index file comprises index blocks, and each index block correspond to one data block;
  by scanning an index file according to a start time period and a stop time period, extracting all index blocks of the time series that need to be aggregated that meet the time period conditions, and then sorting the index blocks according to the data block offset recorded in the index block; and
  by scanning the data file according to a data block offset order recorded in sorted index blocks, performing specified reading and calculating on each data block, and aggregating calculation results. According to the method, the reading of a single time series data or the aggregation operation of multiple time-series data can be completed by only opening a data file once for scanning such that the overall performance is greatly improved.

10 Claims, 1 Drawing Sheet

(56) References Cited

U.S. PATENT DOCUMENTS

2016/0321323 A1* 11/2016 Gaumnitz ........... G06F 16/2272
2016/0328432 A1* 11/2016 Raghunathan ...... G06F 16/2264

FOREIGN PATENT DOCUMENTS

| CN | 106407395 A | * | 2/2017 | ........... G06F 16/244 |
| CN | 106407395 A | | 2/2017 | |
| CN | 106844555 A | | 3/2017 | |
| CN | 106844555 A | * | 6/2017 | |
| CN | 109164980 A | | 1/2019 | |

* cited by examiner

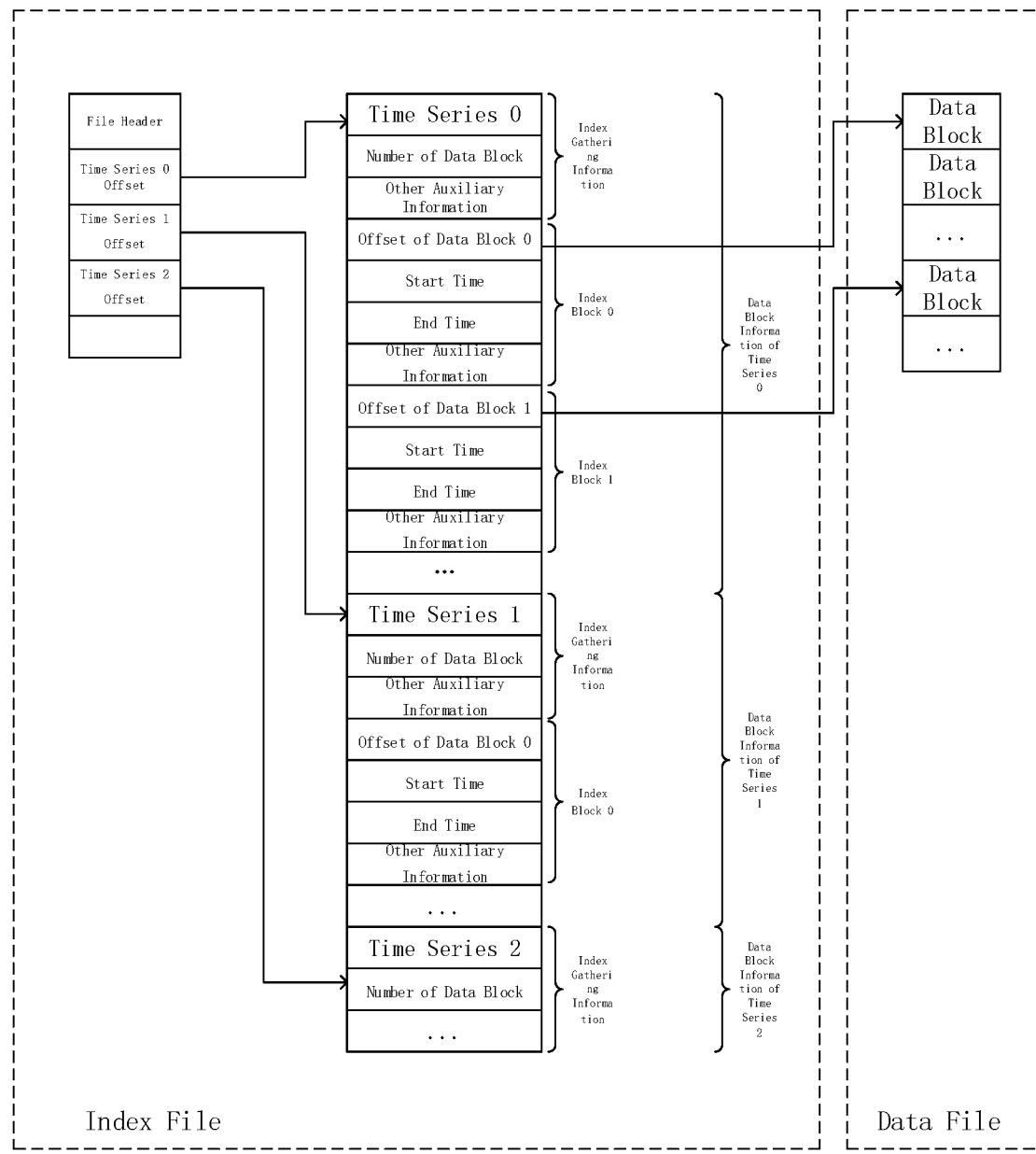

METHOD FOR AGGREGATION OPTIMIZATION OF TIME SERIES DATA

CROSS-REFERENCE TO RELATED APPLICATIONS

This application is a U.S. national stage application of PCT/CN2019/096452 filed Jul. 18, 2019 which claims the benefit of priority to Chinese Patent Application CN201810879115.0 filed Aug. 3, 2018, the entire disclosures of which are incorporated herein by reference.

TECHNICAL FIELD

The invention relates to the field of data processing, specifically to an aggregation optimized processing method for time-series data.

BACKGROUND OF THE INVENTION

Time-series data refers to time series data, which is a data column recorded in chronological order. There is a special time-series database to process the storage and query of time-series data.

In the prior art, one time-series database usually contains multiple time series data. Except for reading a single time series data, multiple time series data usually need to be subjected to an aggregating calculation operation. It is common practice to process each time series independently to obtain results, place them in a cache, and gather and aggregate the results.

However, a database file needs to be scanned once for each time series, and in terms of multiple time series, the database file is required to be opened and scanned multiple times, so that the number of times of disk IO is greatly increased, and the system performance is affected.

SUMMARY OF THE INVENTION

The invention aims to improve the defects of the prior art, and provides an aggregation optimized processing method for time-series data. With the method, the reading of a single time series data or the aggregation operation of multiple time series can be completed by only requiring scanning a data file once such that the times of disk IO are greatly reduced and the overall performance is greatly improved.

The invention provides an aggregation optimized processing method for time-series data, comprising the following steps:

by writing a time-series data record into a database, forming a time-series database file, wherein the time-series database file comprises a data file and an index file, the data file comprises multiple data blocks, the index file comprises index blocks, and each index block correspond to one data block;

scanning an index file according to a start time period and a stop time period, and sorting according by scanning an index file according to a start time period and a stop time period, extracting all index blocks of the time series that need to be aggregated that meet the time period conditions, and then sorting the index blocks according to the data block offset recorded in the index block; and by scanning the data file according to a data block offset order recorded in sorted index blocks, performing specified reading and calculating on each data block, and aggregating calculation results.

Further, when the index blocks are sorted, index blocks with small offsets precede.

Further, the data file contains multiple time-series data blocks.

Further, the index file records information of each time-series data block.

Further, each time series in the index file has one index summary information block and one or more index blocks; the index summary information block contains an ID of the time series and the number of data blocks.

Further, each data block has one corresponding index block that contains an offset, a start time, an end time, and the number of records for the data block in the data file.

Further, after a certain or more time series and time periods are specified, all data blocks meeting the time period condition are extracted, the steps comprising:

searching for an index file, and sorting index blocks according to data block offset recorded in the index blocks after extracting all index blocks of time series required to be aggregated conforming to a time period condition;

by scanning the data file according to a data block offset order recorded in sorted index blocks, reading data block from a data block file; and obtaining data of a specified time period in the data block.

Further, before writing to the database, a time-series data record is written to RAM.

Further, when RAM occupation rate reaches a certain proportion or every certain time, time-series data cached by the RAM is written to a disk.

Further, the step of writing the time-series data to a disk comprises:

1) sorting the data of each time series by time in the RAM;
2) for each time-series data, writing data in RAM to a data file in an appended mode according to a setting of the data block size to generate one or more data blocks;
3) for each new data block, including data block information containing a start time, an end time, and the number of records into one new index block, and writing it to the index file; and
4) continuously storing an index summary information block and index block information of each time series, and regenerating a new block index file each time when the data in RAM is written to the disk.

The aggregation optimized processing method for time-series data provided by the present invention can realize effects as follows:

1) if one data file only contains single time-series data, the number of the data files is too large, and when the aggregation operation is carried out, at least one opening and scanning operation is required for each time series participating in the aggregation. If the number of time series participating in the aggregation is large, the number of times of opening and scanning the file is large and the performance is greatly reduced. The performance can be effectively improved by adopting a mode in which one data file contains multiple time series data;
2) the data file itself stores the collected time-series data, so the file is large, and a new data block is added in an appended mode;
3) according to the method, one index file is designed, and the offset of the data block of one time series in the data file is saved in the index file so that query scanning can be quickly and efficiently carried out; and
4) data blocks of multiple time series participating in the aggregation are sorted according to the offset, and after sorting, the result of the aggregating calculation can be obtained by requiring scanning the data file only once.

BRIEF DESCRIPTION OF THE DRAWINGS

FIG. 1 is a schematic diagram of a structure of a time-series database with an optimized design.

DETAILED DESCRIPTION OF THE INVENTION

While specific implementations of the present invention will be described in detail below, it is necessary to point out that the following implementations are only used for further explanation of the present invention and cannot be understood as a limitation of the protection scope of the present invention. Some non-essential improvements and adjustments made to the present invention by those skilled in the art based on the above content of the present invention still belong to the protection scope of the present invention.

The invention provides an aggregation optimized processing method for time-series data, which is specifically described below.

A database file is formed by writing a time-series data record into a database. The time series database file comprises a data file and an index file, the data file comprising multiple data blocks, the index file comprising index blocks, and each index block corresponding to one data block. A further introduction will be made below.

(1) Data File

The data block file stores the collected time-series data itself, which contains multiple time-series data. To reduce random access and increase read speed, the data is stored in blocks, each block of data belonging to only one time series, but containing multiple records, and sorted by timing of records. When the single time-series data is read, in a given specific time period, only sequential scanning is needed to complete reading a corresponding data block, and the performance can reach the optimum.

In order to reduce the disk IO operation, when the data cached in RAM is placed on the disk, the new data is written into the data block file in an appended mode, that is to say, the new data is always added at the end of the file so that the sequential writing is carried out, the movement of magnetic head is very small, and the random reading and writing times are reduced.

The size of the data block can be configured according to the application scenario, and the number of time series contained in each data file can be configured.

(2) Index File

In order to quickly find a data block for a certain time period of a certain time series, a system is built with an index file. The index file records information of all data block positions in the data file of each time series, and the structure thereof is as shown in FIG. 1.

As shown in FIG. 1, in the index file, there is a time series index table (i.e., a table following a file header, which is located on the left side of the index file in the drawing) and a data block index table (i.e., a table located on the right side of the index file in the drawing). The time series index table records N time series, each occupying a fixed number of bytes, and containing a first offset (Offset) pointing to data block information of the time series. The data block index table records data block information (i.e., data block index information) of N time series.

1) The data block information of each time series has an index gathering information block, and has the following information:
ID of time series
Number of data blocks
Other auxiliary information, such as checksum.

2) After the index gathering information block, there are one or more index blocks, and one data block of a time series in the data file has one corresponding index block. The index block contains the following information:
A offset of the data block in the data block file;
The start time of the data block
The end time of the data block
The number of records contained in the data block
Other auxiliary information, such as pre-aggregated data Each time series ensures that records thereof are chronologically ordered, but data blocks of different time series cannot be ensured to be chronologically ordered in the data file. If $T_{ij}$ represents the start time of time series i and data block j, then there should be the following relationship:

$$T_{i0} < T_{i1} < T_{i2} < \ldots < T_{in}$$

In terms of another time series k, although there is a relationship as above, it can't be ensured that when two series are mixed together for storage, blocks of different series are chronologically ordered.

(3) Write Operation

When an application writes one time-series data record to a database, the system writes to the memory first. When the occupation of the memory reaches a certain proportion or at certain time intervals, the system writes the time-series data cached by the memory into the disk according to the following steps:

1) ensuring that the data of each time series is sorted in the memory according to its timing;
2) writing the memory data into a data block file in an appended mode for each time series data according to the size setting of the data block to generate one or more data blocks;
3) for each new data block, including the start time, the end time, the number of records and the like thereof into one index block, and writing into a block index file; and
4) in order to reduce random reading and writing, an index block of one time series be saved continuously in the index file, so that a new block index file needs to be regenerated every time when the memory data is placed on the disk. But because the block index file is not large, resources are not consumed much.

(4) Reading and Calculating Single Time Series Data

After a certain time series and time period are specified, reading data is carried out according to the following steps:

1) finding a block index file, and finding the offset of a corresponding data block in the data block file;
2) reading a data block from a data block file according to the offset;
3) if the data to be acquired is only a part of one data block, it being possible that the data of a specified time period can be acquired according to methods such as bisearch, time interval proportional search, and the like; and
4) if there are multiple data blocks, processing the next one; wherein, for a single time series, the data blocks, though not physically contiguous, have been sorted by time, resulting in highly efficient access;

(5) Aggregation Query and Calculation

Usually, the simple way to process the aggregation of multiple time series is that each time series is processed independently and the results of each series are then finally aggregated. In doing so, however, the data block file needs to be scanned once for each series. The number of file IO is in direct proportion to the number of aggregated time series. The greater the number of time series, the greater the performance degrades.

Therefore, according to the present application, after the optimization, aggregation query and calculation are carried out according to the following steps:
1) scanning the index file, extracting all index blocks meeting time period conditions and other filtering conditions according to a start time period and a stop time period of aggregating calculation, and storing the index blocks in a cache region, wherein after the scanning is finished, the cache region contains all index blocks meeting conditions in a time series needing to be aggregated;
2) an offset of the corresponding data block in the data file being recorded in the index block, the index blocks held in the cache region being sorted according to the offset, and index blocks with small offsets preceding, wherein, after the sorting is finished, in terms of the same time series, if there are multiple data blocks, the index blocks may be together in a discontinuous way, the start time of the index blocks cannot be ensured to be sorted, and the index blocks are only ensured to be sorted according to the offset; and
3) scanning the data files according to the sorted database, performing specified calculation (such as sum, avg, count, and the like) on each data block, and then gathering the calculation results.

Embodiment 1

The performances before and after the optimization are compared as follows.

In the test, aggregation operations (four: sum, avg, max, min) were performed on 100 time series data. In one group, there were ten thousand records per series; in the other group, there were one million records per series. The comparison of time consumed by the four aggregation operations before and after the optimization was as follows (time unit is millisecond):

|  | sum | avg | max | min |
| --- | --- | --- | --- | --- |
| 100 time series, 10000 records per time series | | | | |
| before optimization | 122.6 | 127.8 | 121.1 | 121.1 |
| after optimization | 49.5 | 53.9 | 49.1 | 47.8 |
| 100 time series, 1000000 records per time series | | | | |
| before optimization | 1138.3 | 1201.1 | 1119.4 | 1118.5 |
| after optimization | 447.1 | 457.9 | 431.6 | 429.9 |

As can be seen from the above two groups of data, when 100 time series were aggregated, the performance was improved by more than 2 times. The improved performance was more pronounced if there was more time series data.

Although the exemplary implementations of the present invention have been described for illustrative purposes, those skilled in the art will understand that various modifications, additions, and substitutions, and like changes can be made in form and details without departing from the scope and spirit of the invention disclosed in the appended claims. All these changes shall fall within the protection scope of the appended claims of the present invention. Various steps in various departments and methods of the products claimed by the present invention can be combined in any combination. Therefore, the description of the implementations disclosed in the present invention is not intended to limit the scope of the present invention, but is used to describe the invention. Accordingly, the scope of the present invention is not limited by the above implementations, but is defined by the claims or the equivalents thereof.

The invention claimed is:

1. A method for aggregation and optimization of time-series data, comprising the following steps:
   by writing a time-series data record into a database, forming a time-series database file comprising a data file and an index file, wherein, the data file comprises a plurality of data blocks, the index file comprises a plurality of index blocks, and each index block corresponds to one data block and contains an offset, a start time and an end time of the corresponded one data block in the data file;
   by scanning the index file according to a start-end time period, extracting all index blocks of the time series that need to be aggregated that meet the start-end time period conditions, storing the extracted all index blocks in a cache area of RAM, and then sorting the index blocks stored in the cache area of RAM according to the offset of data blocks contained in the extracted index blocks in the data file to obtain sorted index blocks; and
   by scanning the data file according to order of data blocks corresponding to the sorted index blocks, performing specified reading and calculating on each data block corresponding to the sorted index blocks, and aggregating calculation results.

2. The method of claim 1, wherein when the index blocks are sorted, index blocks with small offsets precede.

3. The method of claim 1, wherein the data file contains multiple time-series data blocks.

4. The method of claim 1, wherein the index file records information of each time- series data block.

5. The method of claim 4, wherein each time series in the index file has one index summary information block and one or more index blocks; the index summary information block contains an ID of the time series and the number of data blocks.

6. The method of claim 3, wherein each index block further contains the number of time -series data records for the corresponded one data block in the data file.

7. The method of claim 1, wherein by scanning the data file according to a data block offset order recorded in sorted index blocks, performing specified reading on each data block comprise:
   by scanning the data file according to a data block offset order recorded in sorted index blocks, reading data block from a data block file; and
   obtaining data of a specified time period in the data block.

8. The method of claim 1, wherein write the time-series data records to RAM before writing them to the database.

9. The method of claim 8, wherein when RAM occupation rate reaches a certain proportion or every certain time, time-series data cached by the RAM is written to a disk.

10. The method of claim 9, wherein a step of writing time-series data to a disk comprises:
   1) sorting the data of each time series by time in the RAM;
   2) for each time-series data, writing data in RAM to a data file in an appended mode according to a setting of the data block size to generate one or more data blocks;
   3) for each new data block, including data block information containing a start time, an end time, and the number of records into one new index block, and writing it to the index file; and 4) continuously storing an index summary information block and index block information of each time series, and regenerating a new block index file each time when the data in RAM is written to the disk.

* * * * *